(12) United States Patent
Chen et al.

(10) Patent No.: US 10,332,565 B2
(45) Date of Patent: Jun. 25, 2019

(54) VIDEO STREAM STORAGE METHOD, READING METHOD AND DEVICE (71) Applicant: Hangzhou Hikvision Digital Technology Co., Ltd., Hangzhou (CN)

(72) Inventors: Wei Chen, Hangzhou (CN); Weichun Wang, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 15/749,986

(22) PCT Filed: Jul. 25, 2016

(86) PCT No.: PCT/CN2016/091510
§ 371 (c)(1),
(2) Date: Feb. 2, 2018

(87) PCT Pub. No.: WO2017/020737
PCT Pub. Date: Feb. 9, 2017

(65) Prior Publication Data
US 2018/0226104 A1 Aug. 9, 2018

(30) Foreign Application Priority Data

Aug. 4, 2015 (CN) .......................... 2015 1 0471364

(51) Int. Cl.
*G11B 27/30* (2006.01)
*H04N 21/231* (2011.01)
(Continued)

(52) U.S. Cl.
CPC ........ *G11B 27/3081* (2013.01); *G11B 27/034* (2013.01); *G11B 27/105* (2013.01);
(Continued)

(58) Field of Classification Search
CPC .......................... G11B 27/3081; H04N 21/231
See application file for complete search history.

(56) References Cited

U.S. PATENT DOCUMENTS

| 2002/0026458 A1* | 2/2002 | Fujinami | H04N 5/783 |
| | | | 715/273 |
| 2003/0043847 A1* | 3/2003 | Haddad | G11B 27/005 |
| | | | 370/473 |

(Continued)

FOREIGN PATENT DOCUMENTS

| CN | 1232348 A | 10/1999 |
| CN | 1574943 A | 2/2005 |

(Continued)

OTHER PUBLICATIONS

International Search Report for PCT/CN2016/091510 dated Oct. 26, 2016 (7 pages total including English translation).

(Continued)

*Primary Examiner* — Thai Q Tran
*Assistant Examiner* — Sunghyoun Park
(74) *Attorney, Agent, or Firm* — Shumaker, Loop & Kendrick, LLP (57) ABSTRACT The present disclosure provides a video stream storing method and apparatus, and reading method and apparatus. The method comprises: splitting an acquired video stream into I-frame data and non-I-frame data corresponding to the I-frame data, wherein the non-I-frame data contains data in the video stream other than the I-frame data; acquiring a storage address allocated by a data storage server for the non-I-frame data, and storing the non-I-frame data in a storage space of the data storage server to which the storage address points; adding the storage address to the I-frame data; and storing the I-frame data, which contains the storage address, to the data storage server. The present application solves the technical problem of low video stream storage (Continued)

efficiency in the prior art due to the fact that the video stream is stored frame by frame in a sequence in which the video stream is sent.

16 Claims, 6 Drawing Sheets

(51) Int. Cl.
    *G11B 27/034* (2006.01)
    *G11B 27/10* (2006.01)
    *H04N 21/433* (2011.01)
    *H04N 21/845* (2011.01)
    *H04N 21/854* (2011.01)

(52) U.S. Cl.
    CPC ....... *H04N 21/231* (2013.01); *H04N 21/4334* (2013.01); *H04N 21/8455* (2013.01); *H04N 21/85406* (2013.01)

(56) References Cited

U.S. PATENT DOCUMENTS

| | | | |
|---|---|---|---|
| 2003/0128765 A1* | 7/2003 | Yoshigahara | H04N 5/76 375/240.25 |
| 2006/0248216 A1 | 11/2006 | Park | |
| 2008/0063362 A1 | 3/2008 | Grigorian | |
| 2008/0187284 A1* | 8/2008 | Ikeda | G11B 27/005 386/336 |
| 2008/0310630 A1* | 12/2008 | Candelore | H04N 7/1675 380/217 |
| 2009/0086818 A1* | 4/2009 | Kim | G06Q 20/0855 375/240.12 |
| 2010/0142917 A1* | 6/2010 | Isaji | H04N 5/783 386/343 |
| 2010/0195974 A1* | 8/2010 | Zheng | H04N 5/76 386/343 |
| 2012/0163771 A1* | 6/2012 | Li | H04N 21/2387 386/241 |
| 2017/0046226 A1* | 2/2017 | Wang | G06F 3/0619 |

FOREIGN PATENT DOCUMENTS

| | | |
|---|---|---|
| CN | 1649412 A | 8/2005 |
| CN | 2775973 Y | 4/2006 |
| CN | 102870416 A | 1/2013 |
| CN | 103780877 A | 5/2014 |
| EP | 2661084 A1 | 11/2013 |
| WO | 2012075804 A1 | 6/2012 |

OTHER PUBLICATIONS

European Search Report for EP App. No. 16832225.3 dated Feb. 19, 2019 (6 pages).

Toby Walker et al.; "Support for Storage of AVC Content in the MP4 File Format", 61, MPEG Meeting; Jul. 22, 2002-Jul. 26, 2002; Klagenfurt; (Motion Picture Expert Group or ISO/IEC JTC1/SC29/WG11), No. M8708, Jul. 25, 2002 (Jul. 25, 2002), XP030037657.

* cited by examiner

VIDEO STREAM STORAGE METHOD, READING METHOD AND DEVICE

RELATED APPLICATION

The present disclosure claims priority to a Chinese patent application No. 201510471364.2 filed with the State Intellectual Office of People's Republic of China on Aug. 4, 2015 and entitled "Video Stream Storing Method and Apparatus, and Reading Method and Apparatus", which is incorporated herein by reference in its entirety.

TECHNICAL FIELD

The present disclosure relates to the field of data processing, and specifically to a video stream storing method and apparatus, and reading method and apparatus.

BACKGROUND

As people's living standard improves, more and more video throngs into people's life. As massive video is generated, how to improve video storage efficiency becomes a large problem. As well known, video is in diverse formats. It is particularly important to improve the efficiency of storing real-time video (video stream) among the diverse formats.

However, when video stream is stored in the prior art, it is usually stored frame by frame in a sequence in which the video stream is sent. This causes slower storage of the video stream that has a larger amount of data, and might cause slow operation or even failure of the system particularly when a large amount of video stream needs to be stored.

SUMMARY

Embodiments of the present disclosure provide a video stream storing method and apparatus and reading method and apparatus, to at least solve the technical problem of low video stream storage efficiency in the prior art due to the fact that the video stream is stored frame by frame in a sequence in which the video stream is sent.

According to an aspect of embodiments of the present disclosure, there is provided a video stream storing method which is applicable to a video stream storing apparatus, comprising: splitting an acquired video stream into I-frame data and non-I-frame data corresponding to the I-frame data, wherein the non-I-frame data contains data in the video stream other than the I-frame data; acquiring a storage address allocated by a data storage server for the non-I-frame data, and storing the non-I-frame data in a storage space of the data storage server to which the storage address points; adding the storage address to the I-frame data; storing the I-frame data containing the storage address to the data storage server.

Optionally, before storing the I-frame data containing the storage address to the data storage server, the method further comprises: calculating a check value of the I-frame data containing the storage address, wherein the check value is used to restore the I-frame data containing the storage address in the case that the I-frame data containing the storage address is lost; wherein storing the I-frame data containing the storage address to the data storage server comprises: storing the I-frame data containing the storage address and the check value to the data storage server.

Optionally, calculating the check value of the I-frame data containing the storage address comprises: performing calculation on the I-frame data containing the storage address based on a RAID-6 algorithm, to obtain the check value of the I-frame data containing the storage address.

Optionally, acquiring the storage address allocated by the data storage server for the non-I-frame data, and storing the non-I-frame data in the storage space of the data storage server to which the storage address points comprises: sending a storage address request to a metadata storage server, wherein the metadata storage server requests the data storage server to allocate the storage address for the non-I-frame data; receiving the storage address returned by the metadata storage server in response to the storage address request; based on the storage address, writing the non-I-frame data into the storage space of the data storage server to which the storage address points; reporting a data amount of the non-I-frame data that is already written into the data storage server to the metadata storage server.

Optionally, before acquiring the storage address allocated by the data storage server for the non-I-frame data and storing the non-I-frame data in the storage space of the data storage server to which the storage address points, the method further comprises: performing calculation on the non-I-frame data based on a RAID-5 algorithm to obtain XOR check data of the non-I-frame data, the XOR check data being used to restore the non-I-frame data in the case that the non-I-frame data is lost; wherein acquiring the storage address allocated by the data storage server for the non-I-frame data and storing the non-I-frame data in the storage space of the data storage server to which the storage address points comprises: acquiring the storage address allocated by the data storage server for the non-I-frame data and the XOR check data; storing the non-I-frame data and the XOR check data in the storage space of the data storage server to which the storage address points.

According to another aspect of embodiments of the present disclosure, there is provided a video stream reading method which is applicable to a video stream reading apparatus, comprising: acquiring a storage address of I-frame data of a video stream; reading the I-frame data from a data storage server according to the storage address of the I-frame data; parsing a storage address of non-I-frame data of the video stream from the I-frame data; reading the non-I-frame data from the data storage server according to the storage address of the non-I-frame data, wherein the non-I-frame data includes data in the video stream other than the I-frame data; assembling the I-frame data and the non-I-frame data into the video stream.

Optionally, after reading the I-frame data from the data storage server according to the storage address of the I-frame data and before parsing the storage address of the non-I-frame data of the video stream from the I-frame data, the method further comprises: reading a check value of the I-frame data from the data storage server, the check value being pre-obtained by performing calculation on the I-frame data based on a RAID-6 algorithm; checking the I-frame data, wherein the I-frame data is restored according to the check value in the case that it is discovered in the checking that the I-frame data is lost.

Optionally, after reading the non-I-frame data from the data storage server according to the storage address of the non-I-frame data and before assembling the I-frame data and the non-I-frame data into the video stream, the method further comprises: reading an XOR check data of the non-I-frame data from the data storage server, wherein the XOR check data is pre-obtained by performing calculation on the non-I-frame data based on a RAID-5 algorithm; checking the non-I-frame data, wherein the non-I-frame data is restored according to the XOR check data in the case that it is discovered in the checking that the non-I-frame data is lost.

According to another aspect of embodiments of the present disclosure, there is provided a video stream storing apparatus, comprising: a data splitting unit configured to split an acquired video stream into I-frame data and non-I-frame data corresponding to the I-frame data, wherein the non-I-frame data contains data in the video stream other than the I-frame data; a data sending unit configured to acquire a storage address allocated by a data storage server for the non-I-frame data, and store the non-I-frame data in a storage space of the data storage server to which the storage address points; a data adding unit configured to add the storage address to the I-frame data; the data sending unit being further configured to store the I-frame data containing the storage address to the data storage server.

Optionally, the video stream storing apparatus further comprises: a first calculating unit configured to calculate a check value of the I-frame data containing the storage address, wherein the check value is used to restore the I-frame data containing the storage address in the case that the I-frame data containing the storage address is lost; wherein the data sending unit is configured to execute the following step to store the I-frame data containing the storage address to the data storage server: storing the I-frame data containing the storage address and the check value to the data storage server.

Optionally, the first calculating unit is configured to execute the following step to calculate the check value of the I-frame data containing the storage address: performing calculation on the I-frame data containing the storage address based on a RAID-6 algorithm, to obtain the check value of the I-frame data containing the storage address.

Optionally, the data sending unit is configured to execute the following steps to acquire a storage address allocated by a data storage server for the non-I-frame data and to store the non-I-frame data in a storage space of the data storage server to which the storage address points: sending a storage address request to a metadata storage server, wherein the metadata storage server requests the data storage server to allocate the storage address to the non-I-frame data; receiving the storage address returned by the metadata storage server in response to the storage address request; based on the storage address, writing the non-I-frame data into the storage space of the data storage server to which the storage address points; reporting a data amount of the non-I-frame data that is already written into the data storage server to the metadata storage server.

Optionally, the video stream storing apparatus further comprises: a second calculating unit configured to perform calculation on the non-I-frame data based on a RAID-5 algorithm to obtain XOR check data of the non-I-frame data, the XOR check data being used to restore the non-I-frame data in the case that the non-I-frame data is lost; wherein the data sending unit is configured to execute the following steps to acquire the storage address allocated by the data storage server for the non-I-frame data and to store the non-I-frame data in the storage space of the data storage server to which the storage address points: acquiring the storage address allocated by the data storage server for the non-I-frame data and the XOR check data; storing the non-I-frame data and the XOR check data in the storage space of the data storage server to which the storage address points.

According to another aspect of embodiments of the present disclosure, there is also provided a video stream reading apparatus, comprising: an acquiring unit configured to acquire a storage address of I-frame data of the video stream; a first reading unit configured to read the I-frame data from the data storage server according to the storage address of the I-frame data; a parsing unit configured to parse a storage address of non-I-frame data of the video stream from the I-frame data; a second reading unit configured to read the non-I-frame data from the data storage server according to the storage address of the non-I-frame data, wherein the non-I-frame data includes data in the video stream other than the I-frame data; an assembling unit configured to assemble the I-frame data and the non-I-frame data into the video stream.

Optionally, the first reading unit is further configured to read a check value of the I-frame data from the data storage server, the check value being pre-obtained by performing calculation on the I-frame data based on a RAID-6 algorithm; the video stream reading apparatus further comprises: a first checking unit configured to check the I-frame data, wherein the I-frame data is restored according to the check value in the case that it is discovered in the checking that the I-frame data is lost.

Optionally, the second reading unit is further configured to read an XOR check data of the non-I-frame data from the data storage server, wherein the XOR check data is pre-obtained by performing calculation on the non-I-frame data based on a RAID-5 algorithm; the video stream reading apparatus further comprises: a second checking unit configured to check the non-I-frame data, wherein the non-I-frame data is restored according to the XOR check data in the case that it is discovered in the checking that the non-I-frame data is lost.

According to a further aspect, the present disclosure further provides an electronic apparatus, comprising: a housing, a processor, a memory, a circuit board and a power supply circuit, wherein the circuit board is placed in a space enclosed by the housing, the processor and memory are disposed on the circuit board; the power supply circuit is configured to supply power for circuits and devices of the electronic apparatus; the memory is configured to store executable program codes; the processor performs the video stream storing method by executing the executable program codes stored in the memory.

According to a further aspect, the present disclosure further provides a storage medium for storing executable program codes, the executable program codes being executed to perform the video stream storing method.

According to a further aspect, the present disclosure further provides another electronic apparatus, comprising: a housing, a processor, a memory, a circuit board and a power supply circuit, wherein the circuit board is placed in a space enclosed by the housing, the processor and memory are disposed on the circuit board; the power supply circuit is configured to supply power for circuits and devices of the electronic apparatus; the memory is configured to store executable program codes; the processor performs the video stream reading method by executing the executable program codes stored in the memory.

According to a further aspect, the present disclosure further provides another storage medium for storing executable program codes, the executable program codes being executed to perform the video stream reading method.

The following manner is employed in the embodiments of the present disclosure: splitting an acquired video stream into I-frame data and non-I-frame data corresponding to the I-frame data, wherein the non-I-frame data contains data in the video stream other than the I-frame data; acquiring a storage address allocated by a data storage server for the non-I-frame data, and storing the non-I-frame data in a storage space of the data storage server to which the storage address points; adding the storage address to the I-frame data; storing the I-frame data containing the storage address to the data storage server. After the video stream is split into the I-frame data and the non-I-frame data, the acquired storage address of the non-I-frame data is added to the I-frame data to establish the corresponding relationship of the I-frame data and the non-I-frame data. Since the corresponding relationship of the I-frame data and the non-I-frame data is established, it is unnecessary to employ a method of storing the I-frame data first and then storing the non-I-frame data in the prior art, and the I-frame data and non-I-frame data may be concurrently stored, thereby achieving quick storage of the video stream, achieving a technical effect of higher video stream storage efficiency, and thereby solving the technical problem of low video stream storage efficiency in the prior art due to the fact that the video stream is stored frame by frame in a sequence in which the video stream is sent.

BRIEF DESCRIPTION OF THE DRAWINGS

Figures are described herein to provide further understanding of the present disclosure and constitute part of the present disclosure. Exemplary embodiments of the present disclosure and depictions thereof are used to illustrate the present disclosure and do not constitute improper limitations to the present disclosure. In the figures.

DETAILED DESCRIPTION

To enable those skilled in the art to better understand solutions of the present disclosure, technical solutions in embodiments of the present disclosure will be described clearly and completely with reference to figures in the embodiments of the present disclosure. Obviously, embodiments described here are only partial embodiments of the present disclosure, not all embodiments. All other embodiments obtained by those having ordinary skill in the art based on the embodiments of the present disclosure, without making any inventive efforts, fall within the protection scope of the present disclosure.

Noticeably, terms such as "first" and "second" used in the description, claims and figures of the present disclosure are used to distinguish similar objects, not necessarily to describe a specific order or sequential order. It should be appreciated that the thus-used data are interchangeable in proper cases so that the embodiments described herein can be implemented in an order besides the orders illustrated and described herein. In addition, terms "comprise" and "have" and any variants thereof are intended to cover non-exclusive inclusion, for example, a process, method, system, product or apparatus comprising a series of steps or units are not necessarily limited to those clearly listed steps or units, and instead may include other steps or units which are not clearly listed and are intrinsic for these process, method, product or apparatus.

Embodiment 1

According to the embodiments of the present disclosure, there is provided an embodiment of a method of storing a video stream. It needs to be appreciated that steps shown in the flow chart of a figure may be executed in a computer system such as a set of computer-executable instructions, and, although the flow chart shows a logical order, the steps shown or described may be executed in an order different from the order shown herein in some cases.

Figure 1:
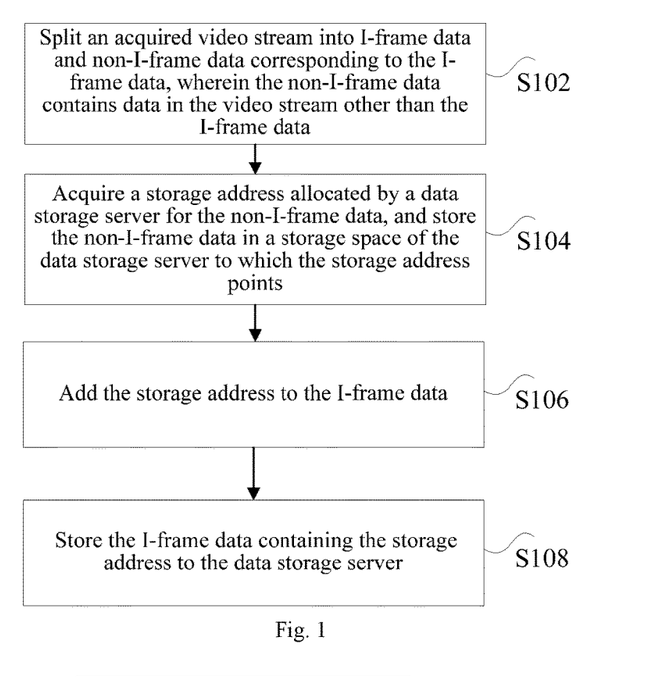
FIG. 1 is a flow chart of an optional video stream storing method according to an embodiment of the present disclosure.

FIG. 1 shows a video stream storing method according to an embodiment of the present disclosure. The method is a method on a side of a video stream storing apparatus. As shown in FIG. 1, the method comprises the following steps:

Step S102: splitting an acquired video stream into I-frame data and non-I-frame data corresponding to the I-frame data, wherein the non-I-frame data contains data in the video stream other than the I-frame data.

Figure 2:
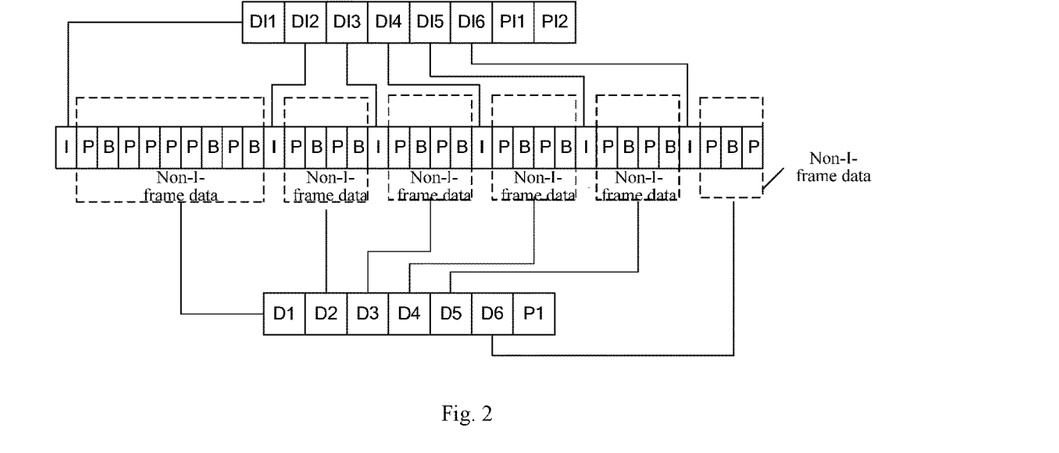
FIG. 2 is a schematic structural diagram of an optional video stream frame format according to an embodiment of the present disclosure.

In the above step S102 of the present disclosure, the video stream may be data transmitted from a monitoring camera which shoots in real time. As shown in FIG. 2, the video stream in the embodiment of the present disclosure comprises I-frame data and non-I-frame data, wherein I frame is also called an inner picture, I frame is usually a first frame of each GOP (Group of Pictures), which serves as a reference point of random access and may be considered as an image. The I frame may also be called a key frame and it is an important frame for inter-frame compressed encoding. Upon decoding, it is sufficient to only use the I frame to re-construct a complete image. The non-I frame comprises P frame and B frame, and the P frame and B frame may also be called reference frames and obtained by predicting from the foregoing I frame. Upon decoding, the image must be re-constructed based on the I frame. The video stream storing apparatus may determine a frame type by checking a header of the frame.

Still as shown in FIG. 2, according to the video stream storing method of the embodiment of the present disclosure, the video stream is split into the I-frame data and non-I-frame data. When the video stream comprises data of multiple I frames, the data of the multiple I frames may be assembled (i.e., stored orderly) into a strip, namely, DI1 to DI6 as shown in FIG. 2, wherein DI1 to DI6 correspond one-to-one with the data of I frame, namely, DI1 corresponds to the data of the first I frame, DI2 corresponds to the data of the second I frame, and so on so forth. When the video stream comprises data of multiple non-I frames, the data of the multiple non-I frames may be assembled into a strip, namely, D1-D6, wherein D1-D6 correspond one-to-one with the data of the non-I frames, namely, D1 corresponds to the data of the first non-I frame, and D2 corresponds to the data of the second non-I frame, and so on so forth.

For example, in FIG. 2 the size of the data of the first I frame is 15K, the size of the data of the second I frame is 9K, the size of the data of the third I frame is 27K, the size of the data of the fourth I frame is 30K, the size of the data of the fifth I frame is 21K, and the size of the data of the sixth I frame is 11K. In the course of assembling the data of the first I frame to the data of the sixth I frame into a strip, it is first determined that the I frame with the largest amount of data in the data of the first I frame to the data of the sixth I frame is the sixth I frame and the sixth I frame has a data size of 30K, then 30K (or larger than 30K) is taken as a reference to reserve a 30K space for the data of each I frame (namely, DI1 to DI6, whereupon DI1 to DI6 do not include data), and finally, the data of the first I frame is placed in DI1, and the data of each I frame is placed orderly in a corresponding space in a similar manner. Likewise, a method of assembling data of the multiple non-I frames into a strip is similar to the method of assembling the data of the multiple I frames into a strip.

Step S104: acquiring a storage address allocated by a data storage server for the non-I-frame data, and storing the non-I-frame data in a storage space of the data storage server to which the storage address points.

In the above step S104 of the present disclosure, since the I-frame data and non-I-frame data have correlation in terms of time (namely, one I-frame data and a set of non-I-frame data constitute a GOP (Group of Pictures), recombination is needed upon reading. Therefore, to find the non-I-frame data corresponding to the I-frame data without requesting a metadata storage server and reduce signaling overhead when the video stream is read subsequently, according to the video stream storing method of the embodiment of the present disclosure, after the video stream is split into the I-frame data and non-I-frame data, the storage address allocated by the data storage server for the non-I-frame data is first acquired, and then the storage address is added to the I-frame data.

It needs to be appreciated that so long as the storage address of the non-I-frame data is acquired, subsequent step S106 and step S108 may be executed, and meanwhile, processing is performed in parallel to store the non-I-frame data into the storage space of the data storage server to which the storage address points, so as to increase the data storing speed.

That is to say, after the storage address of the non-I-frame data is acquired, to increase the data storing speed, the step of storing the non-I-frame data into the storage space of the data storage server to which the storage address points and the step of adding the storage address to the I-frame data and storing the I-frame data containing the storage address to the data storage server may be performed in parallel. Certainly, the non-I-frame data and I-frame data may be stored in a sequential order.

In an optional implementation mode, the above step S104 of acquiring the storage address allocated by the data storage server for the non-I-frame data, and storing the non-I-frame data in the storage space of the data storage server to which the storage address points may comprise:

Step S10: sending a storage address request to a metadata storage server, wherein the metadata storage server requests the data storage server to allocate the storage address for the non-I-frame data.

In the above step S10 of the present disclosure, in a system architecture for cloud storage, the video stream storing apparatus needs to resort to the metadata storage server upon requesting for the storage space, and it is the metadata storage server that requests the data storage server to allocate the storage address for the non-I-frame data.

Figure 3:
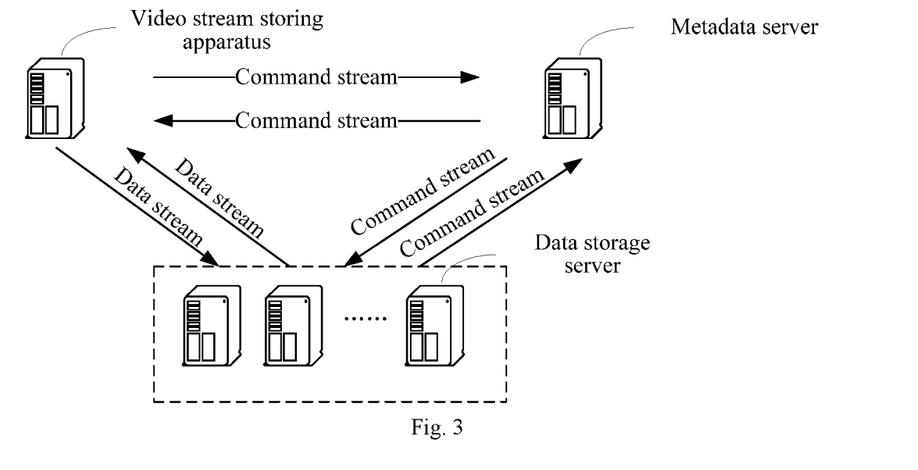
FIG. 3 is a schematic diagram of an optional system architecture according to an embodiment of the present disclosure.

FIG. 3 shows a diagram of the system architecture of the present implementation mode. The video stream storing apparatus first sends a command containing a storage address request to the metadata storage server, wherein the storage address request should include a size of non-I-frame data to be stored. Then the metadata storage server sends the command containing the storage address request to the data storage server. The data storage server allocates the storage address to the non-I-frame data and sends the command containing the storage address to the metadata storage server. Then the metadata storage server forwards the command containing the storage address to the video stream storing apparatus, and the video stream storing apparatus, after acquiring the storage address, may write the data stream including the non-I-frame data into the data storage server according to the storage address. The storing process of subsequent I-frame data is similar thereto and is not detailed any more here.

Step S12: receiving the storage address returned by the metadata storage server in response to the storage address request.

In the above step S12 of the present disclosure, after the data storage server allocates the storage address for the non-I-frame data, the video stream storing apparatus will receive the storage address of the non-I-frame data returned by the metadata storage server in response to the storage address request.

Step S14: according to the storage address, writing the non-I-frame data into the storage space of the data storage server to which the storage address points.

In the above step S14 of the present application, after the video stream storing apparatus acquires the storage address, the non-I-frame data may be directly written into the data storage server.

Step S16: reporting a data amount of the non-I-frame data already written into the data storage server to the metadata storage server.

In the step S16 of the present disclosure, after the non-I-frame data is written into the data storage server, the video stream storing apparatus needs to report a data amount of the non-I-frame data already written into the data storage server to the metadata storage server, so that the metadata storage server records a size of finally-written non-I-frame data.

As such, the metadata storage server may compare the size of the non-I-frame data which is included in the storage address request and is to be stored with the size of the finally-written non-I-frame data recorded by the metadata storage server, so as to determine whether all non-I frames requested to be stored are totally written into the data storage server.

Furthermore, as shown in FIG. 3, the video stream storing apparatus may write the non-I-frame data (I-frame data) into the data storage server, or may acquire the non-I-frame data (I-frame data) from the data storage server.

Step S106: adding the storage address into the I-frame data.

In the above step S106 of the present disclosure, the video stream storing apparatus, after acquiring the storage address of the non-I-frame data, may add the storage address into the I-frame data corresponding to the non-I-frame data, namely, the I-frame data after the addition comprises real data and the storage address of the non-I-frame data.

Step S108: storing the I-frame data containing the storage address to the data storage server.

In the above step S108 of the present disclosure, based on the above step S106, the video stream storing apparatus stores the I-frame data containing the storage address to the data storage server. The method of storing the I-frame data containing the storage address to the data storage server is similar to the above method of storing the non-I-frame data, namely, sending the storage address request to the metadata storage server, wherein the metadata storage server requests the data storage server to allocate the storage address to the I-frame data containing the storage address, and the storage address request should include a size of the I-frame data which contains the storage address and is to be stored; receiving the storage address returned by the metadata storage server in response to the storage address request; based on the storage address, writing the I-frame data containing the storage address into the storage space of the data storage server to which the storage address points; reporting a data amount of the I-frame data that is already written into the data storage server and contains the storage address to the metadata storage server.

Through the above steps, the video stream may be split into the I-frame data and non-I-frame data. After the splitting, the storage address of the acquired non-I-frame data is added to the I-frame data to establish a corresponding relationship of the I-frame data and the non-I-frame data. Since the corresponding relationship of the I-frame data and the non-I-frame data is established, it is unnecessary to employ a method of storing the I-frame data first and then storing the non-I-frame data in the prior art, and the I-frame data and non-I-frame data may be concurrently stored, thereby achieving quick storage of the video stream, achieving a technical effect of higher video stream storage efficiency, and thereby solving the technical problem of low video stream storage efficiency in the prior art due to the fact that the video stream is stored frame by frame in a sequence in which the video stream is sent.

Optionally, before storing the I-frame data containing the storage address to the data storage server, the video stream storing method according to the present embodiment may further comprise:

Step S20: calculating a check value of the I-frame data containing the storage address, wherein the check value is used to restore the I-frame data containing the storage address in the case that the I-frame data containing the storage address is lost.

In the above step S20 of the present disclosure, to provide different data protection modes based on different data types and enhance data security, the video stream storing apparatus may implement the protection of the I-frame data containing the storage address by calculating the check value of the I-frame data containing the storage address. The check value is used to restore the I-frame data containing the storage address in the case that the I-frame data containing the storage address is lost.

Optionally, calculating the check value of the I-frame data containing the storage address comprises: performing calculation on the I-frame data containing the storage address based on a RAID-6 algorithm, to obtain the check value of the I-frame data containing the storage address.

Storing the I-frame data containing the storage address to the data storage server comprises: storing the I-frame data containing the storage address and the check value to the data storage server.

Still as shown in FIG. 2, in the case the number of I-frame data is plural, the video stream storing apparatus may calculate a plurality of check values, and the number of check values should be smaller than or equal to the number of the I-frame data, for example, PI1 and PI2 in FIG. 2. When one I-frame data among DI1-DI6 is lost, the lost I-frame data may be restored through the check values. It is appreciated that the number of data that may be restored by the check value is smaller than or equal to the number of the check values, i.e., if two check values are calculated, at most two lost I-frame data may be restored. To increase security of the I-frame data, a plurality of check values may be calculated, which all should fall within the protection scope of the embodiment of the present disclosure.

Additionally, to improve the security of the I-frame data, the video stream storing apparatus according to the present embodiment may further protect the I-frame data by erasure code reconstruction or in a duplicate manner.

Optionally, before acquiring the storage address allocated by the data storage server for the non-I-frame data and storing the non-I-frame data in the storage space of the data storage server to which the storage address points, the video stream storing method according to the present embodiment may further comprise:

Step S30: performing calculation on the non-I-frame data based on a RAID-5 algorithm to obtain XOR check data of the non-I-frame data, the XOR check data being used to restore the non-I-frame data in the case that the non-I-frame data is lost.

In the above step S30 of the present disclosure, to provide different data protection modes based on different data types and enhance data security, the video stream storing apparatus may further protect the non-I-frame data based on the RAID-5 algorithm.

Acquiring the storage address allocated by the data storage server for the non-I-frame data and storing the non-I-frame data in the storage space of the data storage server to which the storage address points comprises: acquiring the storage address allocated by the data storage server for the non-I-frame data and the XOR check data; storing the non-I-frame data and the XOR check data in the storage space of the data storage server to which the storage address points.

Still as shown in FIG. 2, in the case the number of non-I-frame data is plural, the video stream storing apparatus may calculate a plurality of XOR check data, and the number of XOR check data should be smaller than or equal to the number of the non-I-frame data. For example, for P1 in FIG. 2, when one non-I-frame data among D1-D6 is lost, the lost non-I-frame data may be restored through the XOR check data. It is appreciated that the number of data that may be restored by the XOR check data is smaller than or equal to the number of the XOR check data, i.e., if one XOR check data is calculated, at most one lost non-I-frame data may be restored. To increase security of the non-I-frame data, a plurality of XOR check data may be calculated, which all should fall within the protection scope of the embodiment of the present disclosure.

In the embodiment of the present disclosure, the acquired video stream is split into I-frame data and non-I-frame data corresponding to the I-frame data, wherein the non-I-frame data comprises data in the video stream other than the I-frame data; the storage address allocated by the data storage server for the non-I-frame data is acquired, and the non-I-frame data is stored in the storage space of the data storage server to which the storage address points; the storage address is added to the I-frame data; the I-frame data containing the storage address is stored in the data storage server. After the video stream is split into the I-frame data and the non-I-frame data, the acquired storage address of the non-I-frame data is added to the I-frame data to establish the corresponding relationship of the I-frame data and the non-I-frame data. Since the corresponding relationship of the I-frame data and the non-I-frame data is established, it is unnecessary to employ a method of storing the I-frame data first and then storing the non-I-frame data in the prior art, and the I-frame data and non-I-frame data may be stored concurrently, thereby achieving quick storage of the video stream, achieving a technical effect of higher video stream storing efficiency, and thereby solving the technical problem of low video stream storage efficiency in the prior art due to the fact that the video stream is stored frame by frame in a sequence in which the video stream is sent.

Embodiment 2

According to the embodiment of the present disclosure, there is provided an embodiment of a method of reading a video stream. It needs to be appreciated that steps shown in the flow chart of a figure may be executed in a computer system such as a set of computer-executable instructions, and, although the flow chart shows a logical order, the steps shown or described may be executed in an order different from the order herein in some cases.

Figure 4:
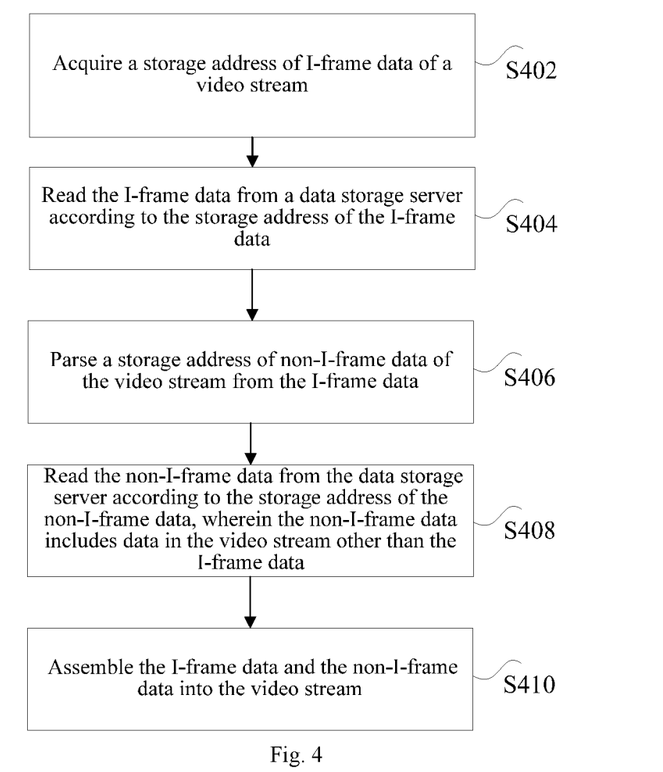
FIG. 4 is a flow chart of an optional video stream reading method according to an embodiment of the present disclosure.

FIG. 4 shows a video stream reading method according to an embodiment of the present disclosure. The method is a method on a side of a video stream reading apparatus. As shown in FIG. 4, the method comprises the following steps:

Step S402: acquiring a storage address of I-frame data of a video stream.

In the above step S402 of the present disclosure, the video stream reading method corresponding to the aforesaid video stream storing method will be described in the present embodiment. During the reading of the video stream, it is only necessary to find the I-frame data, and then the non-I-frame data may be found through the storage address of the non-I-frame data contained by the I-frame data. the signaling overhead may be reduced and the reading rate may be improved without the necessity to request to the metadata storage server for many times. While reading the video stream, a video stream reading apparatus may first request the metadata storage server for the storage address of the I-frame data to be read.

Step S404: reading the I-frame data from a data storage server according to the storage address of the I-frame data.

In the step S404 of the present disclosure, the video stream reading apparatus reads the I-frame data from the data storage server according to the acquired storage address of the I-frame data, wherein the I-frame data contains the storage address of the non-I-frame data corresponding thereto.

Step S406: parsing a storage address of non-I-frame data of the video stream from the I-frame data.

In the step S406 of the present disclosure, the video stream reading apparatus parses the storage address of the non-I-frame data of the video stream from the read I-frame data.

Optionally, to provide different data protection modes based on different data types and enhance data security, after reading the I-frame data from the data storage server according to the storage address of the I-frame data and before parsing the storage address of the non-I-frame data of the video stream from the I-frame data, the method further comprises: reading a check value of the I-frame data from the data storage server, the check value being pre-obtained by performing calculation on the I-frame data based on a RAID-6 algorithm; checking the I-frame data, wherein the I-frame data is restored according to the check value in the case that it is discovered in the checking that the I-frame data is lost.

Step S408: reading the non-I-frame data from the data storage server according to the storage address of the non-I-frame data, wherein the non-I-frame data includes data in the video stream other than the I-frame data.

In the step S408 of the present disclosure, the video stream reading apparatus reads the non-I-frame data from the data storage server according to the storage address of the obtained non-I-frame data by parsing, wherein the non-I-frame data includes data in the video stream other than the I-frame data.

Step S410: assembling the I-frame data and the non-I-frame data into the video stream.

In the step S410 of the present disclosure, the video stream reading apparatus assembles the I-frame data and the non-I-frame data into the video stream. The assembling here may be understood as placing in order.

Optionally, to provide different data protection modes based on different data types and enhance data security, after reading the non-I-frame data from the data storage server according to the storage address of the non-I-frame data and before assembling the I-frame data and the non-I-frame data into the video stream, the method further comprises: reading an XOR check data of the non-I-frame data from the data storage server, wherein the XOR check data is pre-obtained by performing calculation on the non-I-frame data based on a RAID-5 algorithm; checking the non-I-frame data, wherein the non-I-frame data is restored according to the XOR check data in the case that it is discovered in the checking that the non-I-frame data is lost.

As known from the above, the solution provided by the above embodiment of the present disclosure achieves a technical effect of reducing the signaling overhead and improving the reading rate by splitting the video stream into the I-frame data and the non-I-frame data, acquiring the storage address of the non-I-frame data and then adding the storage address into the I-frame data, and then finding the non-I-frame data by only finding the I-frame data, without the necessity to request the metadata storage server for many times.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate that the embodiments described in the description all belong to preferred embodiments, and the involved actions and modules are not necessarily requisite for the present disclosure.

Through the description of the above embodiments, those skilled in the art may clearly understand that the methods according to the above embodiments may be implemented by virtue of software plus necessary general-purpose hardware platform, and certainly may be implemented by hardware. However, in many cases, the former is a better implementation mode. Based on such understanding, the essence of technical solution of the present disclosure or the portion making contribution over the prior art may be embodied in the form of a software product. The computer software product is stored in a storage medium (e.g., ROM/RAM, magnetic disc, or optical disk), and contains several instructions to enable one terminal equipment (a mobile phone, computer, server, network equipment or the like) to execute the methods according to embodiments of the present disclosure.

Embodiment 3

According to the embodiment of the present disclosure, there is further provided an embodiment of an apparatus for implementing the above method embodiment. The apparatus provided by the above embodiment of the present disclosure may run on a computer terminal.

Figure 5:
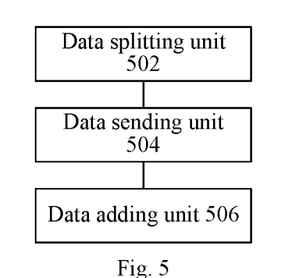
FIG. 5 is a schematic structural diagram of an optional video stream storing apparatus according to an embodiment of the present disclosure.

FIG. 5 is a schematic structural diagram of a video stream storing apparatus according to an embodiment of the present disclosure.

As shown in FIG. 5, the video stream storing apparatus may comprise a data splitting unit 502, a data sending unit 504 and a data adding unit 506.

The data splitting unit 502 is configured to split an acquired video stream into I-frame data and non-I-frame data corresponding to the I-frame data, wherein the non-I-frame data contains data in the video stream other than the I-frame data; the data sending unit 504 is configured to acquire a storage address allocated by a data storage server for the non-I-frame data, and store the non-I-frame data in a storage space of the data storage server to which the storage address points; the data adding unit 506 is configured to add the storage address to the I-frame data; the data sending unit 502 is further configured to store the I-frame data containing the storage address to the data storage server.

As known from the above, in the solution provided by the above Embodiment 3 of the present disclosure, the video stream is split into I-frame data and non-I-frame data; after the splitting, the acquired storage address of the non-I-frame data is added to the I-frame data to establish a corresponding relationship of the I-frame data and the non-I-frame data; since the corresponding relationship of the I-frame data and the non-I-frame data is established, it is unnecessary to employ a method of storing the I-frame data first and then storing the non-I-frame data in the prior art, and the I-frame data and non-I-frame data may be stored concurrently, thereby achieving quick storage of the video stream, achieving a technical effect of higher video stream storing efficiency, and thereby solving the technical problem of low video stream storage efficiency in the prior art due to the fact that the video stream is stored frame by frame in a sequence in which the video stream is sent.

It needs to be appreciated that the data splitting unit 502, the data sending unit 504 and the data adding unit 506 correspond to step S102 to step S108 in Embodiment 1, the three modules are implemented in the same examples and application scenario as the corresponding steps, but not limited to the content disclosed in the above Embodiment 1. It is noted that the above modules, as parts of the apparatus, may run in a computer terminal, and may be implemented through either software or hardware.

Figure 6:
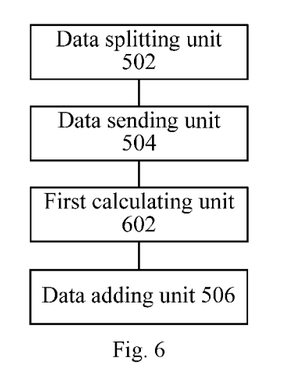
FIG. 6 is a schematic structural diagram of another optional video stream storing apparatus according to an embodiment of the present disclosure.

Optionally, as shown in FIG. 6, the video stream storing apparatus further comprises a first calculating unit 602.

The first calculating unit 602 is configured to calculate a check value of the I-frame data containing the storage address, wherein the check value is used to restore the I-frame data containing the storage address in the case that the I-frame data containing the storage address is lost; wherein the data sending unit 504 is configured to execute the following step to store the I-frame data containing the storage address to the data storage server: storing the I-frame data containing the storage address and the check value to the data storage server.

Optionally, the first calculating unit 602 is configured to execute the following step to calculate the check value of the I-frame data containing the storage address: performing calculation on the I-frame data containing the storage address based on a RAID-6 algorithm, to obtain the check value of the I-frame data containing the storage address.

Optionally, the data sending unit 504 is configured to execute the following steps to acquire the storage address allocated by a data storage server for the non-I-frame data and to store the non-I-frame data in the storage space of the data storage server to which the storage address points: sending a storage address request to a metadata storage server, wherein the metadata storage server requests the data storage server to allocate the storage address to the non-I-frame data; receiving the storage address returned by the metadata storage server in response to the storage address request; based on the storage address, writing the non-I-frame data into the storage space of the data storage server to which the storage address points; reporting a data amount of the non-I-frame data that is already written into the data storage server to the metadata storage server.

Figure 7:
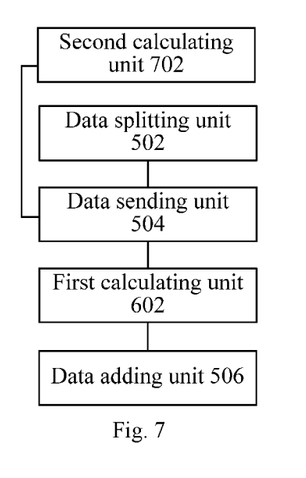
FIG. 7 is a schematic structural diagram of a further optional video stream storing apparatus according to an embodiment of the present disclosure.

Optionally, as shown in FIG. 7, the video stream storing apparatus further comprises: a second calculating unit 702.

The second calculating unit 702 is configured to perform calculation on the non-I-frame data based on a RAID-5 algorithm to obtain XOR check data of the non-I-frame data, the XOR check data being used to restore the non-I-frame data in the case that the non-I-frame data is lost; wherein the data sending unit 504 is configured to execute the following step to acquire the storage address allocated by the data storage server for the non-I-frame data and store the non-I-frame data in the storage space of the data storage server to which the storage address points: acquiring the storage address allocated by the data storage server for the non-I-frame data and the XOR check data; storing the non-I-frame data and the XOR check data in the storage space of the data storage server to which the storage address points.

In the embodiment of the present disclosure, the acquired video stream is split into I-frame data and non-I-frame data corresponding to the I-frame data, wherein the non-I-frame data comprises data in the video stream other than the I-frame data; the storage address allocated by the data storage server for the non-I-frame data is acquired, and the non-I-frame data is stored in the storage space of the data storage server to which the storage address points; the storage address is added to the I-frame data; the I-frame data containing the storage address is stored in the data storage server. After the video stream is split into the I-frame data and the non-I-frame data, the acquired storage address of the non-I-frame data is added to the I-frame data to establish the corresponding relationship of the I-frame data and the non-I-frame data. Since the corresponding relationship of the I-frame data and the non-I-frame data is established, it is unnecessary to employ a method of storing the I-frame data first and then storing the non-I-frame data in the prior art, and the I-frame data and non-I-frame data may be stored concurrently, thereby achieving quick storage of the video stream, achieving a technical effect of higher video stream storing efficiency, and thereby solving the technical problem of low video stream storage efficiency in the prior art caused by the video stream being stored frame by frame in a sequence in which the video stream is sent.

Embodiment 4

According to the embodiment of the present disclosure, there is further provided an embodiment of an apparatus for implementing the above method embodiment. The apparatus provided by the above embodiment of the present disclosure may run on a computer terminal.

Figure 8:
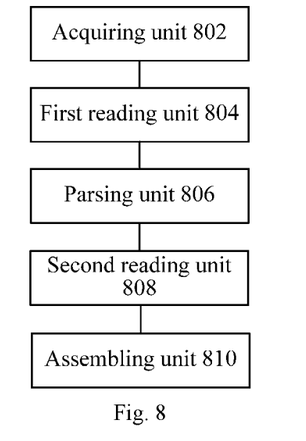
FIG. 8 is a schematic structural diagram of an optional video stream reading apparatus according to an embodiment of the present disclosure.

FIG. 8 is a schematic structural diagram of a video stream reading apparatus according to an embodiment of the present disclosure.

As shown in FIG. 8, the video stream reading apparatus may comprise an acquiring unit 802, a first reading unit 804, a parsing unit 806, a second reading unit 808 and an assembling unit 810.

The acquiring unit 802 is configured to acquire a storage address of I-frame data of a video stream; the first reading unit 804 is configured to read the I-frame data from a data storage server according to the storage address of the I-frame data; the parsing unit 806 is configured to parse a storage address of non-I-frame data of the video stream from the I-frame data; the second reading unit 808 is configured to read the non-I-frame data from the data storage server according to the storage address of the non-I-frame data, wherein the non-I-frame data contains data in the video stream other than the I-frame data; the assembling unit 810 is configured to assemble the I-frame data and the non-I-frame data into the video stream.

As known from the above, the solution provided by the above Embodiment 4 of the present disclosure achieves a technical effect of reducing the signaling overhead and improving the reading rate by splitting the video stream into the I-frame data and non-I-frame data, acquiring the storage address of the non-I-frame data and then adding the storage address into the I-frame data, and then finding the non-I-frame data by only finding the I-frame data, without need to request the metadata storage server for many times.

It needs to be appreciated that the acquiring unit 802, the first reading unit 804, parsing unit 806, second reading unit 808 and the assembling unit 810 correspond to step S402 to step S410 in Embodiment 2. The five modules are implemented in the same examples and application scenario as the corresponding steps, but not limited to the content disclosed in the above Embodiment 2. It is noted that the above modules, as parts of the apparatus, may run in a computer terminal, and may be implemented through either software or hardware.

Figure 9:
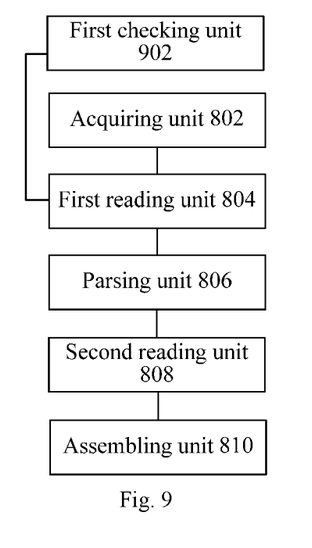
FIG. 9 is a schematic structural diagram of another optional video stream reading apparatus according to an embodiment of the present disclosure.

Optionally, the first reading unit 804 is further configured to read a check value of the I-frame data from the data storage server, the check value being pre-obtained by performing calculation on the I-frame data based on a RAID-6 algorithm;

As shown in FIG. 9, the apparatus further comprises a first checking unit 902 configured to check the I-frame data, wherein the I-frame data is restored according to the check value in the case that it is discovered in the checking that the I-frame data is lost.

Optionally, the second reading unit 808 is further configured to read an XOR check data of the non-I-frame data from the data storage server, wherein the XOR check data is pre-obtained by performing calculation on the non-I-frame data based on a RAID-5 algorithm.

Figure 10:
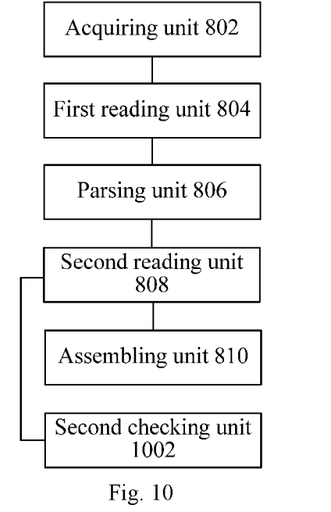
FIG. 10 is a schematic structural diagram of a further optional video stream reading apparatus according to an embodiment of the present disclosure.

As shown in FIG. 10, the apparatus further comprises a second checking unit 1002 configured to check the non-I-frame data, wherein the non-I-frame data is restored according to the XOR check data in the case that it is discovered in the checking that the non-I-frame data is lost.

The serial numbers of the above embodiments of the present disclosure are only for illustrative purpose and do not represent superiority of the embodiments.

Figure 11:
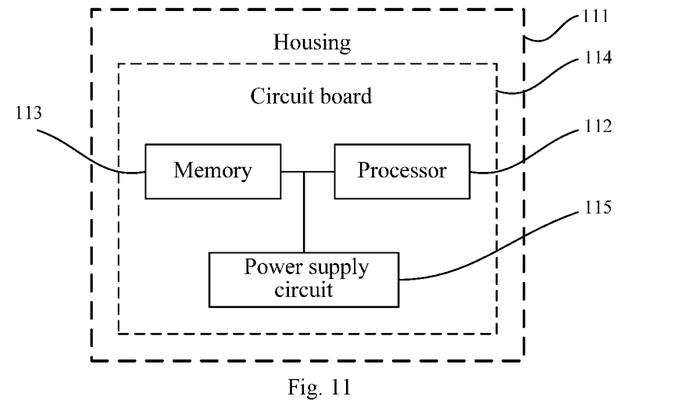
FIG. 11 is a schematic structural diagram of an electronic apparatus according to an embodiment of the present disclosure.

An embodiment of the present disclosure further provides an electronic apparatus, as shown in FIG. 11, comprising: a housing 111, a processor 112, a memory 113, a circuit board 114 and a power supply circuit 115, wherein the circuit board 114 is placed in a space enclosed by the housing 111, the processor 112 and memory 113 are disposed on the circuit board 114; the power supply circuit 115 is configured to supply power for circuits and devices of the electronic apparatus; the memory 113 is configured to store executable program codes; the processor 112 performs the following steps by executing the executable program codes stored in the memory:

splitting an acquired video stream into I-frame data and non-I-frame data corresponding to the I-frame data, wherein the non-I-frame data contains data in the video stream other than the I-frame data;

acquiring a storage address allocated by a data storage server for the non-I-frame data, and storing the non-I-frame data in a storage space of the data storage server to which the storage address points;

adding the storage address to the I-frame data;

storing the I-frame data, which contains the storage address, to the data storage server.

In the embodiment of the present disclosure is employed the following manner: splitting an acquired video stream into I-frame data and non-I-frame data corresponding to the I-frame data, wherein the non-I-frame data contains data in the video stream other than the I-frame data; acquiring a storage address allocated by a data storage server for the non-I-frame data, and storing the non-I-frame data in a storage space of the data storage server to which the storage address points; adding the storage address to the I-frame data; storing the I-frame data, which contains the storage address, to the data storage server. After the video stream is split into the I-frame data and the non-I-frame data, the acquired storage address of the non-I-frame data is added to the I-frame data to establish the corresponding relationship of the I-frame data and the non-I-frame data. Since the corresponding relationship of the I-frame data and the non-I-frame data is established, it is unnecessary to employ a method of storing the I-frame data first and then storing the non-I-frame data in the prior art, and the I-frame data and non-I-frame data may be stored concurrently, thereby achieving quick storage of the video stream, achieving a technical effect of higher video stream storing efficiency, and thereby solving the technical problem of low video stream storage efficiency in the prior art due to the fact that the video stream is stored frame by frame in a sequence in which the video stream is sent.

The electronic apparatus exists in many forms which include but are not limited to:

(1) mobile communication devices: this type of devices are characterized by possession of a mobile communication function and mainly aim to provide voice and data communication. This type of terminals comprise: smart phones (e.g., iPhone), multi-media phones, functional phones, low-end phones and the like.

(2) Ultra-mobile personal computer devices: this type of devices fall within a category of personal computers, have computing and processing functions, and generally also have a mobile Internet-surfing property. This type of terminals comprise PDA, MID and UMPC, for example iPad.

(3) Portable entertainment devices: this type of devices may display and play multi-media content. This type of devices comprise audio player, video player (e.g., iPod), handheld game player, E-book, smart toys and portable vehicle-mounted navigator.

(4) Servers: a server is a device providing computing service. The server comprises a processor, a hard disk, a memory, a system bus and the like. The server is similar to a general-purpose computer in architecture, but imposes higher requirements in terms of processing capability, stability, reliability, security, extensibility, manageability and the like as providing highly-reliable service.

(5) Other electronic apparatuses having a digital interaction function.

An embodiment of the present disclosure provides a storage medium for storing executable program codes, the executable program codes being executed to perform the video stream storing method, wherein the video stream storing method may comprise:

splitting an acquired video stream into I-frame data and non-I-frame data corresponding to the I-frame data, wherein the non-I-frame data contains data in the video stream other than the I-frame data;

acquiring a storage address allocated by a data storage server for the non-I-frame data, and storing the non-I-frame data in a storage space of the data storage server to which the storage address points;

adding the storage address to the I-frame data;

storing the I-frame data, which contains the storage address, to the data storage server.

In the embodiment of the present disclosure is employed the following manner: splitting an acquired video stream into I-frame data and non-I-frame data corresponding to the I-frame data, wherein the non-I-frame data contains data in the video stream other than the I-frame data; acquiring a storage address allocated by a data storage server for the non-I-frame data, and storing the non-I-frame data in a storage space of the data storage server to which the storage address points; adding the storage address to the I-frame data; storing the I-frame data, which contains the storage address, to the data storage server. After the video stream is split into the I-frame data and the non-I-frame data, the acquired storage address of the non-I-frame data is added to the I-frame data to establish the corresponding relationship of the I-frame data and the non-I-frame data. Since the corresponding relationship of the I-frame data and the non-I-frame data is established, it is unnecessary to employ a method of storing the I-frame data first and then storing the non-I-frame data in the prior art, and the I-frame data and non-I-frame data may be stored concurrently, thereby achieving quick storage of the video stream, achieving a technical effect of higher video stream storing efficiency, and thereby solving the technical problem of low video stream storage efficiency in the prior art caused by the video stream being stored frame by frame in a sequence in which the video stream is sent.

An embodiment of the present disclosure further provides another electronic apparatus, which structure is the same as the structure shown in FIG. 11 and comprises a housing, a processor, a memory, a circuit board and a power supply circuit, wherein the circuit board is placed in a space enclosed by the housing, the processor and memory are disposed on the circuit board; the power supply circuit is configured to supply power for circuits and devices of the electronic apparatus; the memory is configured to store executable program codes; the processor performs the following steps by executing the executable program codes stored in the memory:

acquiring a storage address of the I-frame data of the video stream;

reading the I-frame data from a data storage server according to the storage address of the I-frame data;

parsing a storage address of non-I-frame data of the video stream from the I-frame data;

reading the non-I-frame data from the data storage server according to the storage address of the non-I-frame data, wherein the non-I-frame data includes data in the video stream other than the I-frame data;

assembling the I-frame data and the non-I-frame data into the video stream.

The solution provided by the above embodiment of the present disclosure achieves a technical effect of reducing the signaling overhead and improving the reading rate by splitting the video stream into the I-frame data and the non-I-frame data, acquiring the storage address of the non-I-frame data and then adding the storage address into the I-frame data, and then finding the non-I-frame data by only finding the I-frame data, without the necessity to request the metadata storage server for many times.

The electronic apparatus exists in many forms which include but are not limited to:

(1) mobile communication devices: this type of devices are characterized by possession of a mobile communication function and mainly aim to provide voice and data communication. This type of terminals comprise: smart phones (e.g., iPhone), multi-media phones, functional phones, low-end phones and the like.

(2) Ultra-mobile personal computer devices: this type of devices fall within a category of personal computers, have computing and processing functions, and generally also have a mobile Internet-surfing property. This type of terminals comprise PDA, MID and UMPC, for example iPad.

(3) Portable entertainment devices: this type of devices may display and play multi-media content. This type of devices comprise audio player, video player (e.g., iPod), handheld game player, E-book, smart toys and portable vehicle-mounted navigator.

(4) Servers: a server is a device providing computing service. The server comprises a processor, a hard disk, a memory, a system bus and the like. The server is similar to a general-purpose computer in architecture, but imposes higher requirements in terms of processing capability, stability, reliability, security, extensibility, manageability and the like as providing highly-reliable service.

(5) Other electronic apparatuses having a digital interaction function.

An embodiment of the present disclosure provides another storage medium for storing executable program codes, the executable program codes being executed to perform the video stream reading method, wherein the video stream reading method may comprise:

acquiring a storage address of the I-frame data of the video stream;

reading the I-frame data from a data storage server according to the storage address of the I-frame data;

parsing a storage address of non-I-frame data of the video stream from the I-frame data;

reading the non-I-frame data from the data storage server according to the storage address of the non-I-frame data, wherein the non-I-frame data includes data in the video stream other than the I-frame data;

assembling the I-frame data and the non-I-frame data into the video stream.

The solution provided by the above embodiment of the present disclosure achieves a technical effect of reducing the signaling overhead and improving the reading rate by splitting the video stream into the I-frame data and non-I-frame data, acquiring the storage address of the non-I-frame data and then adding the storage address into the I-frame data, and then finding the non-I-frame data by only finding the I-frame data, without the necessity to request the metadata storage server for many times.

The embodiments about the apparatuses, electronic apparatuses, applications and storage media are described simpler as they are substantially similar to the method embodiments, and reference may be made to parts of depictions of the method embodiments for relevant portions.

In the above embodiments, different emphasis is placed on respective embodiments, and reference may be made to related depictions in other embodiments for portions not detailed in a certain embodiment.

In the embodiments provided by the present disclosure, it should be understood that the revealed technical content can be implemented in other ways. For example, the above-described embodiments for the apparatus are only exemplary, e.g., the division of the units may be a logical functional division, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be via some interfaces, and indirect coupling or communicative connection of units or modules may be electrical or in other forms.

The units described as separate parts may be or may not be physically separated, the parts shown as units may be or may not be physical units, i.e., they can be located in one place, or distributed on a plurality of units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented in the form of software functional units.

If the aforementioned integrated unit is implemented in the form of software function units and sold or used as independent products, they may be stored in a computer readable storage medium. Based on such understanding, the essence of technical solution of the present disclosure or the portion making contribution over the prior art or all or part of the technical solution may be embodied in the form of a software product. The computer software product is stored in a storage medium, and includes several instructions to enable a computer device (which may be a mobile phone, server, network equipment or the like) to execute all or partial steps of the methods according to embodiments of the present disclosure. The foregoing storage medium comprises various media that may store program codes, such as U disk, Read-Only Memory (ROM), a Random Access Memory (RAM), a mobile hard disk, magnetic disk, or an optical disk.

What are stated above are only preferred embodiments of the present disclosure. It should be appreciated that those having ordinary skill in the art, without departing from the principles of the present disclosure, may make several improvements and modifications which should be considered as falling within the extent of protection of the present disclosure.

What is claimed is:

1. A video stream storing method, wherein the video stream storing method is applied to a video stream storing apparatus and comprises:
   splitting an acquired video stream into I-frame data and non-I-frame data corresponding to the I-frame data, wherein the non-I-frame data contains data in the video stream other than the I-frame data;
   sending a storage address request to a metadata storage server, wherein the metadata storage server requests the data storage server to allocate the storage address for the non-I-frame data;
   receiving the storage address returned by the metadata storage server in response to the storage address request;
   based on the storage address, writing the non-I-frame data into the storage space of the data storage server to which the storage address points;
   reporting a data amount of the non-I-frame data that is already written into the data storage server to the metadata storage server;
   adding the storage address allocated for the non-I-frame data to the I-frame data;
   storing the I-frame data containing the storage address, to the data storage server.

2. The method according to claim 1, wherein before storing the I-frame data containing the storage address to the data storage server, the method further comprises:
   calculating a check value of the I-frame data containing the storage address, wherein the check value is used to restore the I-frame data containing the storage address in the case that the I-frame data containing the storage address is lost;
   wherein storing the I-frame data containing the storage address to the data storage server comprises:
   storing the I-frame data containing the storage address and the check value to the data storage server.

3. The method according to claim 2, wherein calculating the check value of the I-frame data containing the storage address comprises:
   performing calculation on the I-frame data containing the storage address based on a RAID-6 algorithm, to obtain the check value of the I-frame data containing the storage address.

4. The method according to claim 1, wherein before acquiring the storage address allocated by the data storage server for the non-I-frame data and storing the non-I-frame data in the storage space of the data storage server to which the storage address points, the method further comprises:
   performing calculation on the non-I-frame data based on a RAID-5 algorithm to obtain XOR check data of the non-I-frame data, the XOR check data being used to restore the non-I-frame data in the case that the non-I-frame data is lost;
   wherein acquiring the storage address allocated by the data storage server for the non-I-frame data and storing the non-I-frame data in the storage space of the data storage server to which the storage address points comprises:
   acquiring the storage address allocated by the data storage server for the non-I-frame data and the XOR check data;

storing the non-I-frame data and the XOR check data in the storage space of the data storage server to which the storage address points.

5. An electronic apparatus, wherein the electronic apparatus comprises: a housing, a processor, a memory, a circuit board and a power supply circuit, wherein the circuit board is placed in a space enclosed by the housing, the processor and memory are disposed on the circuit board; the power supply circuit is configured to supply power for circuits and devices of the electronic apparatus; the memory is configured to store executable program codes; the processor performs the video stream storing method according to claim 1 by executing the executable program codes stored in the memory.

6. A non-transitory storage medium, wherein the storage medium is used for storing executable program codes, wherein the executable program codes are executed to perform the video stream storing method according to claim 1.

7. A video stream reading method, wherein the video stream reading method is applied to a video stream reading apparatus and comprises:
    acquiring a storage address of I-frame data of a video stream;
    reading the I-frame data from a data storage server according to the storage address of the I-frame data;
    parsing a storage address of non-I-frame data of the video stream from the I-frame data;
    reading the non-I-frame data from the data storage server according to the storage address of the non-I-frame data, wherein the non-I-frame data contains data in the video stream other than the I-frame data;
    reading an XOR check data of the non-I-frame data from the data storage server, wherein the XOR check data is pre-obtained by performing calculation on the non-I-frame data based on a RAID-5 algorithm;
    checking the non-I-frame data, wherein the non-I-frame data is restored according to the XOR check data in the case that it is discovered in the checking that the non-I-frame data is lost;
    assembling the I-frame data and the non-I-frame data into the video stream.

8. The method according to claim 7, wherein after reading the I-frame data from the data storage server according to the storage address of the I-frame data and before parsing the storage address of the non-I-frame data of the video stream from the I-frame data, the method further comprises:
    reading a check value of the I-frame data from the data storage server, the check value being pre-obtained by performing calculation on the I-frame data based on a RAID-6 algorithm;
    checking the I-frame data, wherein the I-frame data is restored according to the check value in the case that it is discovered in the checking that the I-frame data is lost.

9. An electronic apparatus, comprising: a housing, a processor, a memory, a circuit board and a power supply circuit, wherein the circuit board is placed in a space enclosed by the housing, the processor and memory are disposed on the circuit board; the power supply circuit is configured to supply power for circuits and devices of the electronic apparatus; the memory is configured to store executable program codes; the processor performs the video stream reading method according to claim 7 by executing the executable program codes stored in the memory.

10. A non-transitory storage medium, wherein the storage medium is used for storing executable program codes, wherein the executable program codes are executed to perform the video stream storing method according to claim 7.

11. A video stream storing apparatus, comprising: a processor, a memory, wherein the memory is configured to store executable program codes; the processor performs a method by executing the executable program codes stored in the memory, the method comprising:
    splitting an acquired video stream into I-frame data and non-I-frame data corresponding to the I-frame data, wherein the non-I-frame data contains data in the video stream other than the I-frame data;
    sending a storage address request to a metadata storage server, wherein the metadata storage server requests the data storage server to allocate the storage address for the non-I-frame data;
    receiving the storage address returned by the metadata storage server in response to the storage address request;
    based on the storage address, writing the non-I-frame data into the storage space of the data storage server to which the storage address points;
    adding the storage address to the I-frame data;
    storing the I-frame data containing the storage address to the data storage server.

12. The apparatus according to claim 11, wherein the method further comprises:
    calculating a check value of the I-frame data containing the storage address, wherein the check value is used to restore the I-frame data containing the storage address in the case that the I-frame data containing the storage address is lost;
    wherein storing the I-frame data containing the storage address to the data storage server comprises:
    storing the I-frame data containing the storage address and the check value to the data storage server.

13. The apparatus according to claim 12, wherein calculating the check value of the I-frame data containing the storage address comprises:
    performing calculation on the I-frame data containing the storage address based on a RAID-6 algorithm, to obtain the check value of the I-frame data containing the storage address.

14. The apparatus according to claim 11, wherein before acquiring the storage address allocated by the data storage server for the non-I-frame data and storing the non-I-frame data in the storage space of the data storage server to which the storage address points, the method further comprises:
    performing calculation on the non-I-frame data based on a RAID-5 algorithm to obtain an XOR check data of the non-I-frame data, the XOR check data being used to restore the non-I-frame data in the case that the non-I-frame data is lost;
    wherein acquiring the storage address allocated by the data storage server for the non-I-frame data and storing the non-I-frame data in the storage space of the data storage server to which the storage address points comprises:
    acquiring the storage address allocated by the data storage server for the non-I-frame data and the XOR check data;
    storing the non-I-frame data and the XOR check data in the storage space of the data storage server to which the storage address points.

15. A video stream reading apparatus, comprising: a housing, a processor, a memory, a circuit board and a power supply circuit, wherein the circuit board is placed in a space enclosed by the housing, the processor and memory are disposed on the circuit board; the power supply circuit is configured to supply power for circuits and devices of the electronic apparatus; the memory is configured to store executable program codes; the processor performs a method applied to a video stream reading apparatus by executing the executable program codes stored in the memory, the method comprising:

acquiring a storage address of I-frame data of a video stream;

reading the I-frame data from a data storage server based on the storage address of the I-frame data;

parsing a storage address of non-I-frame data of the video stream from the I-frame data;

reading the non-I-frame data from the data storage server according to the storage address of the non-I-frame data, wherein the non-I-frame data contains data in the video stream other than the I-frame data;

reading an XOR check data of the non-I-frame data from the data storage server, wherein the XOR check data is pre-obtained by calculating the non-I-frame data based on a RAID-5 algorithm;

checking the non-I-frame data, wherein the non-I-frame data is restored according to the XOR check data in the case that it is discovered in the checking that the non-I-frame data is lost;

assembling the I-frame data and the non-I-frame data into the video stream.

16. The apparatus according to claim 15, wherein after reading the I-frame data from the data storage server according to the storage address of the I-frame data and before parsing the storage address of the non-I-frame data of the video stream from the I-frame data, the method further comprises:

reading a check value of the I-frame data from the data storage server, the check value being pre-obtained by performing calculation the I-frame data based on a RAID-6 algorithm;

checking the I-frame data, wherein the I-frame data is restored according to the check value in the case that it is discovered in the checking that the I-frame data is lost.

* * * * *